United States Patent [19]
Reilly et al.

[11] 3,848,660
[45] Nov. 19, 1974

[54] PLASTIC HEAT EXCHANGE APPARATUS AND A METHOD FOR MAKING

[75] Inventors: Thomas A. Reilly, Reading, Pa.; Charles F. Reitz; Robert D. Smith, both of Wilmington, Del.

[73] Assignee: E. I. du Pont de Nemours and Company, Wilmington, Del.

[22] Filed: Sept. 22, 1972

[21] Appl. No.: 291,182

Related U.S. Application Data

[62] Division of Ser. No. 64,221, Aug. 17, 1970, Pat. No. 3,718,181.

[52] U.S. Cl. .................................. 165/1, 165/46
[51] Int. Cl. ............................................. F28f 7/00
[58] Field of Search ................ 165/180, 46, 1, 158; 264/311, 331

[56] References Cited
UNITED STATES PATENTS
3,438,434   4/1969   Smith ................................ 165/158

FOREIGN PATENTS OR APPLICATIONS
1,376,352   9/1964   France ................................ 165/46

Primary Examiner—Charles Sukalo

[57] ABSTRACT

Hollow plastic filaments, useful in heat exchange systems, which are made from plastic compositions containing 5 to 45 percent by weight of filler particles having substantially higher thermal conductivity than the plastic and a diameter greater than 2.0 microns, will have high thermal conductivity and appreciable mechanical strength if the particles are chosen such that the ratio of the particle diameter to the wall thickness of the filament is between 0.001 and 0.5 and if the particles are dispersed within the plastic homogeneously enough to produce the desired mechanical stability and heterogeneously enough to take advantage of the high thermal conductivity of such a dispersion.

4 Claims, 4 Drawing Figures

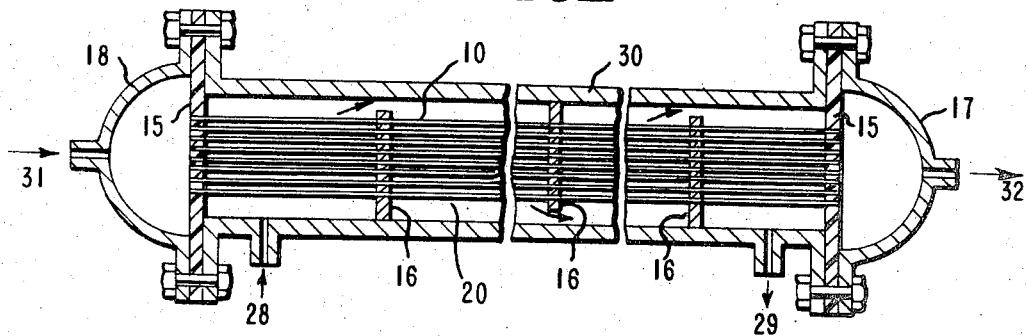
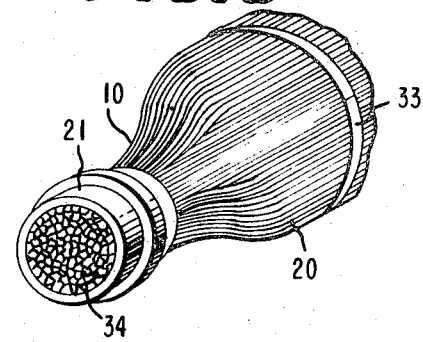
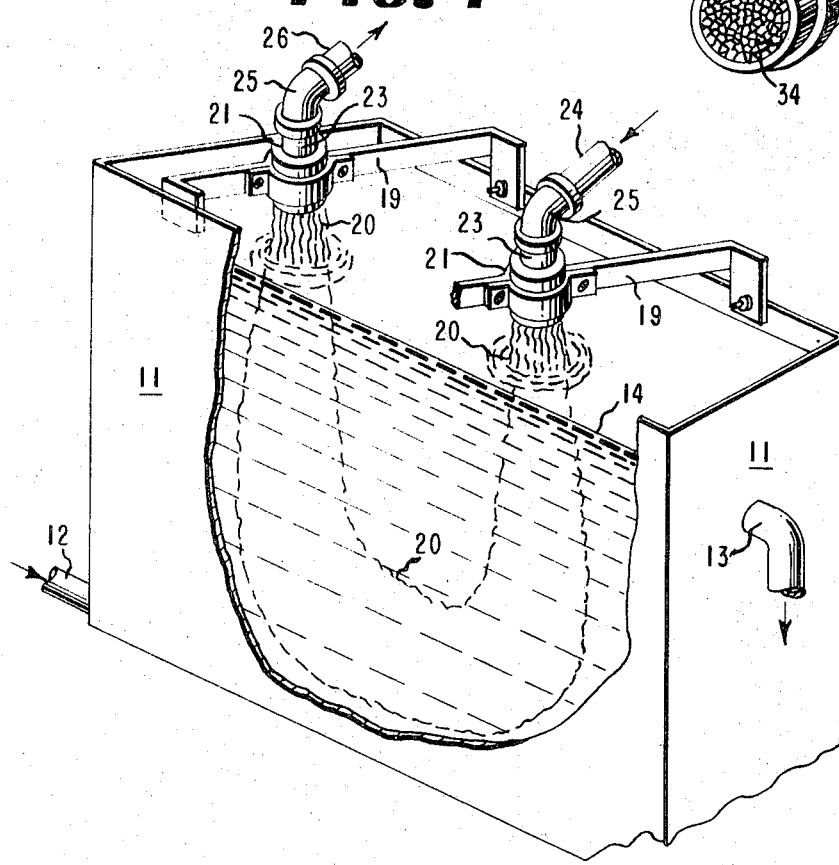

PLASTIC HEAT EXCHANGE APPARATUS AND A METHOD FOR MAKING

This is a division of application Ser. No. 64,221, filed on Aug. 17, 1970 now U.S. Pat. No. 3,718,181, granted Feb. 27, 1973.

BACKGROUND OF THE INVENTION

This invention relates to a heat exchange apparatus. More specifically, it relates to a heat exchange apparatus comprising a plurality of fluid-tight, hollow filaments made from filled plastic compositions, particularly graphite filled polyfluorinated plastics. More specifically still, it relates to hollow fluid-tight filaments for use in a heat exchange apparatus and a method for producing such filaments in a manner such that they have high thermal conductivity and appreciable mechanical strength.

Plastic heat exchangers, particularly those made from polyfluorinated plastics, such as tetrafluoroethylene or copolymers of tetrafluoroethylene and hexafluoropropylene, have become a useful addition to the array of heat exchanges developed over the past few years, especially in those circumstances where one of the heat exchange media is a corrosive fluid. Plastics, in particular polyfluorinated plastics, however, have a thermal conductivity which is so low that heat exchange devices made from them are not highly efficient. This defect can and has been overcome in part by using a large number of small diameter hollow plastic filaments which are incorporated into a heat exchange bundle having a total surface area large enough so that the heat transfer between the fluid flowing through the interior of the individual filaments and the fluid flowing around the tube bundle is large enough to provide sufficient cooling.

The efficiency of such heat exchange units is still relatively low, however, so there is a need for an improved material for use in such structures which has both the imperviousness to corrosive fluids of the polyfluorinated plastics and increased conductivity. Structures made from polyfluorinated plastics filled with graphite would be expected to have such characteristics, and indeed such structures have been proposed and built. Generally they consist of a very high percentage of graphite, between 70 percent and 90 percent, with a small amount of a polyfluorinated plastic used as a binder to hold the graphite together. Such structures are mechanically rigid blocks, similar to a block of pure carbon, with holes drilled through them through which a first heat exchange fluid can pass. They are brittle and the surface area exposed to the second heat exchange fluid is generally small, so that even with the improved conductivity of the material, the efficiency of the structure is relatively low.

There is, therefore, a need for an improved combination of polyfluorinated plastics and graphite fillers which can be made into more flexible structures, such as filaments having a high surface area, which in turn can be incorporated into heat exchange structures, such as the one illustrated in U.S. Pat. No. 3,228,456 for a Method and Apparatus Employing Hollow Polyfluorinated Plastic Filaments for Heat Exchange, which issued to P. F. Brown et al. on Jan. 11, 1966. Attempts to formulate flexible filaments from such a combination have, however, run into two related problems which have to date frustrated all attempts to produce useful products. It has been a generally accepted proposition that before the thermal conductivity of the filled plastics can be increased significantly, large amounts of filler would have to be incorporated into them. Once large amounts of filler are used, however, the flexibility and the mechanical durability of the filaments decreases to a point where they are no better, mechanically, than the block structures discussed above.

It is, therefore, an object of the present invention to provide a hollow filament made from a filled plastic composition having a thermal conductivity substantially greater than that of the plastic, and yet having a durability large enough so that such a structure can be used in a conventional heat exchange device. It is a further object of the present invention to provide a method for incorporating thermally conductive fillers into plastic compositions and to produce hollow filaments from such mixtures which have appreciably increased thermal conductivity and appreciable mechanical strength.

SUMMARY OF THE INVENTION

These and other objects of the present invention have been achieved by providing a heat exchanger of the type having a casing member, a plurality of hollow plastic filaments, means for securing the ends of the filaments in a fixed relationship with the casing member, means for passing a first fluid through the interior of the filaments, and means for passing a second fluid through the casing member in intimate contact with the outer surface of the filaments. The filaments comprise a plastic composition containing 5 to 45 percent by weight of filler particles having a thermal conductivity substantially greater than the thermal conductivity of the plastic. Substantially all of the filler particles have a diameter greater than 2 microns, and the ratio of the diameter of the filler particles to the wall thickness of the filaments is between 0.001 to 0.5. The filler particles are distributed homogeneously enough in the plastic so that the filaments have a tensile strength greater than 1,000 psi and an elongation to failure of greater than 25 percent, both as measured at room temperature, and heterogeneously enough so that the filaments have a thermal conductivity greater than one and a half times the thermal conductivity of the plastic. In the preferred embodiment, the plastic is a polyfluorinated plastic such as a polymer of tetrafluoroethylene or a copolymer of tetrafluoroethylene and hexafluoropropylene, the filler particles are graphite filler particles and the percentage of filler particles in the plastic composition is between 10 and 25 percent by weight.

One process whereby filaments for use in such structures can be produced comprises: dry mixing pellets of polyfluorinated polymers and particles of graphite, substantially all of which have a diameter greater than 2.0 microns, to form a dry mixture comprising 5 to 45 percent by weight of the graphite; forcing the dry mixture into a high energy low temperature, mechanical mixing region, wherein the mixture can be mechanically milled; mixing the dry mixture in the mixing region while maintaining the bulk temperature of the mixture below the melt point of the polymer, until a semisolid, flowable mixture is formed; forcing the flowable mixture into a melting region where the bulk temperature of the mixture is maintained at not more than 50°F. above the melt point of the polymer; melting the mixture until an extrudable mixture is formed; and extruding the extrudable mixture into hollow filaments in which the ratio of the diameter of the filler particles to the wall thickness of the filaments is between 0.001 to 0.5. In the preferred embodiment, the dry mixture contains 5 to 25 percent by weight of the graphite and the mixing region is formed between two co-rotating screws, having varying cross sections which divide the mixing region into a plurality of mixing zones adapted to impart varying degrees of energy to the mixing process.

The details of the present invention can best be described with reference to the following figures, wherein:

FIG. 2 is an elevation view in section of one embodiment of the heat exchange structure of the present invention;

FIG. 3 is an end view of a terminal portion of one embodiment of the tube bundle of the present invention in which the individual filaments have been honeycombed together; and FIG. 4 is a cut away view of a second embodiment of the heat exchange structure of the present invention in which the terminal arrangement of FIG. 3 has been utilized.

DETAILED DESCRIPTION OF THE FIGURES

Figure 1:
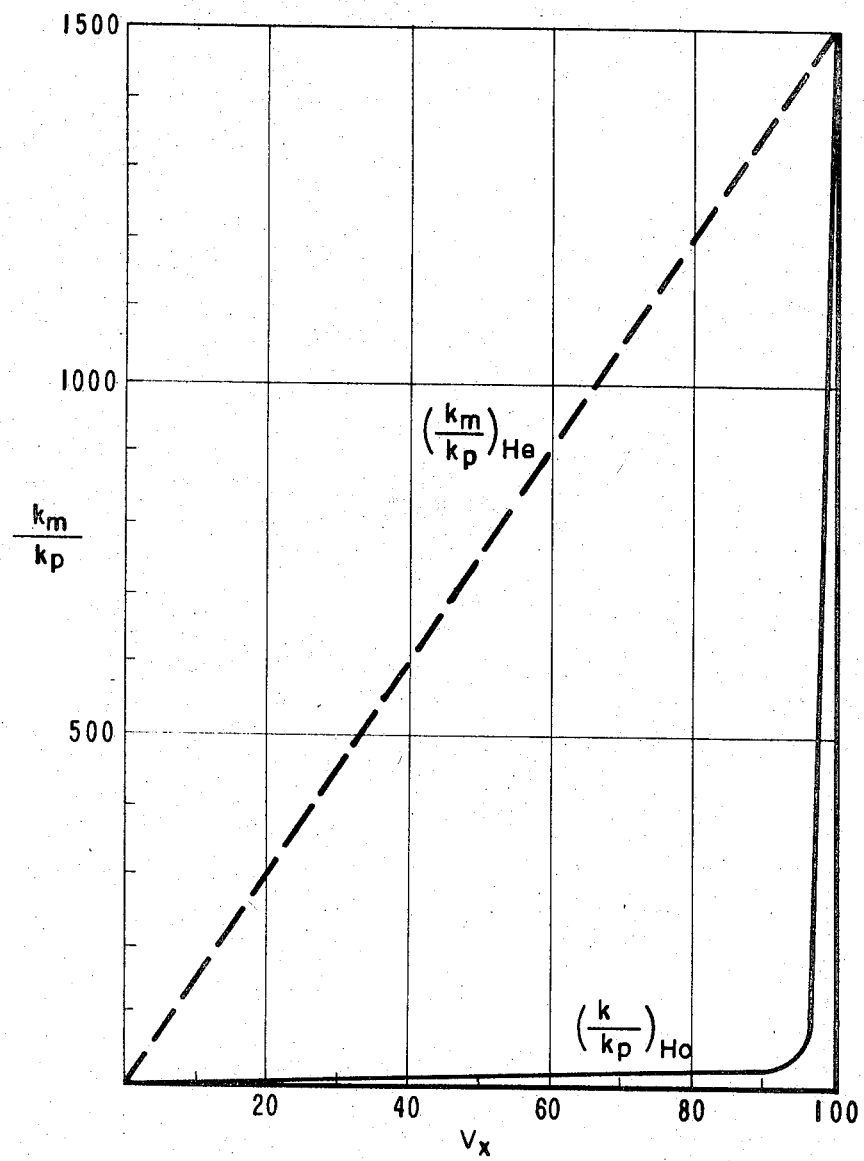
FIG. 1 is a plot of the increase in thermal conductivity of a filled plastic as a function of the percentage of filler contained in the plastic for both the situations where the filler is dispersed perfectly homogeneously within the plastic and the situations where the filler is dispersed perfectly heterogeneously within the plastic.

Faced with the problem of incorporating filler particles into plastic in a manner such that the mechanical characteristics of the plastic are retained, one instinctively thinks of a homogeneous distribution of fillers in the plastic. Assuming that the thermal conductivity of the filler, $k_x$, is 1,500 times the thermal conductivity of the plastic, $k_p$, so that $k_x/k_p = 1,500$, (which is substantially the situation when the filler is graphite and the plastic is a polyfluorinated plastic), the gain in thermal conductivity of the homogeneous mixture, $(k_m/k_p)_{Ho}$ can be completely defined by:

$$r_m = V_p r_p + V_x r_x ,$$

or since $$V_p = (1 - V_x) ,$$

$$r_m = (1 - V_x) r_p + V_x r_x$$

where $r_m$, $r_p$ and $r_x$ are the thermal resistance of the mixture, the plastic and the filler, respectively, and $V_p$ and $V_x$ are the volume percent of the plastic and the filler present in the mixture, respectively. So:

$$(r_m/r_p)_{Ho} = (1 - V_x) + V_x(r_x/r_p) ,$$

where the subscript Ho stands for "homogeneous mixture," or since $$(r_x/r_p)_{Ho} = 1/(k_x/k_p) = 1/1500$$

$$(r_m/r_p)_{Ho} = (1 - V_x) + V_x/1500 = (k_p/k_m)$$

Values of $(k_m/k_p)_{Ho}$ and its reciprocal $(k_m/k_p)_{Ho}$ for various filler levels are given in Table I and plotted on FIG. 1 as the unbroken line.

TABLE 1

| $V_x$ | $(r_m/r_p)_{Ho}$ | $(k_m/k_p)_{Ho}$ |
|---|---|---|
| 1 | 0.99 | 1.01 |
| 10 | 0.90 | 1.11 |
| 20 | 0.80 | 1.25 |
| 25 | 0.75 | 1.34 |
| 30 | 0.70 | 1.42 |
| 45 | 0.65 | 1.54 |
| 50 | 0.50 | 2.00 |
| 70 | 0.30 | 3.30 |
| 100 | 0.0007 | 1500 |

To achieve any appreciable increase in thermal conductivity using a homogeneous distribution of filler in the plastic, therefore, a large percentage filler, in the range of from 70 to 90 percent, is needed.

If instead of a homogeneous mixture, a completely heterogeneous mixture is sought, a different set of equations would define the mixture. Assuming the system is a slab having a surface area A and thickness ΔT, and the filler is a plug having a surface area $A_x$ and thickness ΔT running through the slab, so that the plastic has a surface area $A_p$ and a thickness ΔT; then the mixture would be described by the heat balance equation $$Q_m = q_x + q_p$$

where $q_x$ and $q_p$ are the heat transferred through the filler material and the plastic, respectively, and $Q_m$ is the heat transferred through the entire system; or $$k_m A \Delta T = k_x A_x \Delta T + k_p A_p \Delta T$$

$$(k_m/k_p)_{He} = (k_x/k_p)(A_x \Delta T/A \Delta T) + A_p \Delta T/A \Delta T,$$

where the subscript He stands for "heteregeneous mixture." Since $A_p = A - A_x$ and since $(A_x \Delta T/A \Delta T) = V_x$, then $$(k_m/k_p)_{He} = k_x/k_p V_x + (1 - V_x) , \text{ or}$$

$$(k_m/k_p)_{He} = 1,500 V_x + (1 - V_x).$$

Values of $(k_m/k_p)_{He}$ for various filler levels are given in Table II and plotted on FIG. 1 as the dashed line.

TABLE II

| $V_x$ | $(k_m/k_p)_{He}$ |
|---|---|
| 1 | 15.99 |
| 10 | 150.9 |
| 20 | 300.8 |
| 50 | 750.5 |
| 100 | 1500 |

Naturally, the normal situation of a non-homogeneous, nonheterogeneous mixture falls somewhere between the two, with the norm for any reasonable "mixing" process falling closer to the line for a homogeneous mixture than the line for a heterogeneous mixture.

For flexible heat exchange filaments, completely heterogeneous mixtures are not useful. Structures made from such a mixture would be brittle in the regions occupied only by the filler, and would most likely be permeable to one of the heat exchange fluids. On the other hand, filaments made from a completely homogeneous mixture are also impractical because some 70 percent by volume of filler would be needed before an appreciable increase in thermal conductivity could be realized. In terms of the mechanical durability of the filament, this would lead to the same result as obtained with a completely heterogeneous mixture.

The key to the present invention is the realization that a significant increase in the thermal conductivity of the system can be achieved by using a mixture containing only a small percentage of the filler, 5 percent to 45 percent by weight, if the proper distribution of the filler in the plastic is used. Such a distribution would have to be homogeneous enough to give reasonable mechanical durability, and heterogeneous enough to give a reasonable increase in conductivity. For use in heat exchangers, such as those shown in FIGS. 2 and 4, a filament must have a tensile strength of at least 1,000 psi and an elongation to break of at least 25 percent, both as measured at room temperature, so that it will have sufficient burst strength and flex life to withstand the stresses that variations in line pressure and external vibrations exert on the system. Naturally, any increase in the conductivity is useful, but before such a filament becomes practical an increase of at least 50 percent over the conductivity of the plastic is needed.

The key to achieving such a balance of properties is to be found in the choice of the particle size of the filler used and/or in the process used to incorporate the filler into the plastic composition. Blenders of filled plastic have previously ignored particle size as a factor to be considered, for several reasons. First, they have generally not been interested in increasing the thermal conductivity of the material. Second, if such was their intent, the structures they were concerned with had such a large ratio of particle diameter, $d_p$, to wall thickness, $t$, that no matter what they did, they could not depart significantly from the homogeneous model. We have found that if the particle size is kept above 2.0 microns and the ratio of particle diameter to wall thickness of the filament ($d_p/t$) is kept between 0.001 and 0.5, or preferably 0.001 to 0.1, the distribution of particles is generally homogeneous enough to yield the desired strength, and heterogeneous enough to yield the desired conductivity. To use particles having a diameter much smaller than this or having such that the ratio ($d_p/t$) is much less than this, inherently produces a homogeneous product, which will have a low conductivity. On the other hand, if ($d_p/t$) is too high, the structure will not have the desired mechanical strength. It should be noted, however, that small particles which have agglomerated together to form an aggregate particle having a diameter greater than 2.0 microns will also produce the desired result and are to be included in the meaning of "particles having a diameter of greater than 2.0 microns." It should also be noted that "over mixing" of particles having diameters within the optimum range may destroy any advantage that might be expected from the use of such particles, because the mixture so formed becomes too homogeneous.

In the discussion that follows, we will deal with polyfluorinated plastics, particularly polymers of tetrafluoroethylene and copolymers of tetrafluoroethylene and hexafluoropropylene, sold under the tradename Teflon by E. I. du Pont de Nemours and Co., and with carbon, or more specifically graphite, as the filler. These substances are particularly important because of their imperviousness to corrosive fluids, but it should be noted that when non-corrodability is not important, this invention is equally applicable to any plastic and to any filler with a thermal conductivity substantially greater than that of the plastic.

EXAMPLES I - IV

Using two metering hoppers, graphite particles and pellets of Teflon FEP were fed into a Werner & Pfleiderer ZSK extruder. This extruder consists of two co-rotating screws having varying cross sections to define a plurality of separate zones adapted to impart varying degrees of energy to the mixing process. In this case, the extruder had ten zones some of which are used for mechanical milling and some of which are used to pump and melt the mixture. In the present process, the first two zones of the extruder were used to dry mix the ingredients. In the next six zones, the mixture was mechanically milled between the two co-rotating screws until a semisolid, flowable mixture was produced. During this operation, the bulk temperature of the mixture was kept below the melting point of the polymer. Since the mechanical milling imparts heat to the mixture, heat had to be removed by some cooling means located at about the middle of the mixing region; in this case between the fifth and sixth zone. The last two zones were pumping and melting zones in which the bulk temperature of the mixture was raised to about 50°F. above the melting point of the polymer. In actual operation, the extrudable melt was pumped from the extruder through a pelletizing die and cutter and the resulting pellets were processed in a single-screw extruder to make the tubing. The two processes can, however, be incorporated into a single operation performed by a single extruder rather than two extruders. For reasons of economics, the tubing was drawn about 2X, but this step is not necessary and can be dispensed with, if desired.

Generally, graphite particles having a diameter of between 2.5 and 44 microns were used, at filling percentages of between 5 to 30 percent by weight. The experimental work was confined to these values because the present interest is in small diameter tubes having wall thickness ranging from 10 to 30 mils, which are more sensitive to particle size and filler percentage than larger tubes. Nothing in the results indicated that larger particles and filler percentages up to 45 percent could not be used, especially if the diameter of the tubing is increased up to 50 mils and if the drawing step is not needed. The best results, however, were obtained with the 2.5 micron particles in a filler range between 10 to 20 percent by weight. These products had a thermal conductivity of about three times the thermal conductivity of the particles, and had tensile strengths above 6,000 psi and elongation to failure of about 400 percent, as measured at room temperature. Similar products formed using the 44 micron filler particles tended to have a number of voids. It is believed this was due to the fact that the Teflon did not wet the graphite and that the voids, which were only noticeable when the larger particles were used, were present in all samples. In any case, the presence of voids was accentuated by the drawing step. The results of tests run on four of the best samples are given in Table III below.

Referring to FIG. 2, the individual filaments 10 are gathered into a tube bundle 20, the terminal portions of which are securely bonded to header plates 15. A cylindrical shell, or casing, 30, having a fluid inlet means 28 and a fluid outlet means 29 is provided, and the headers 15 are sealed between end caps 17 and 18 and shell 30 in a fixed leak-tight relationship. An inlet 31

TABLE III

| Sample | $d_p$ (microns) | $V_r$ (%) | $t$ (microns) | $(d_p/t)$ | percent elongation to break (%) | tensile strength (psi) |
| --- | --- | --- | --- | --- | --- | --- |
| I | 2.5 | 20 | 425 | .0059 | 390 | 6,200 |
| II | 2.5 | 20 | 413 | .0061 | 405 | 6,700 |
| III | 2.5 | 17 | 417 | .0060 | 380 | 6,500 |
| IV | 2.5 | 17 | 405 | .0062 | 380 | 6,400 | and an outlet 32 is provided in end caps 17 and 18 to provide a means for passing a first fluid through the interior of the filaments 10. A second fluid is then introduced into inlet 28 and allowed to come into intimate contact with the outer surface of the individual filaments. One of the two fluids is hotter than the other, and depending on the needs involved, the cooler fluid can be used to cool the hotter fluid or the hotter fluid can be used to heat the cooler fluid. Spacers 16 are provided to keep the individual filaments in reasonably constant spaced apart relationship, both with respect to other filaments and with respect to the walls.

The critical feature of such a heat exchanger is that the individual filaments 10 must all be secured in a leak-tight manner to the headers 15. One way in which this can be accomplished is shown in FIG. 3 in which the individual filaments 10 are honeycombed together into a sleeve 21. This type of terminal portion, and the method of producing it, is described in U.S. Pat. No. 3,315,740, for a Flexible Plastic Tube Bundle and Method of Making, issued to M. S. Withers on Apr. 25, 1967. Briefly it consists of placing the terminal portions of a tube bundle 20 of substantially parallel filaments 10 into a rigid sleeve 21, which is integrally lined with an internal liner of the same material from which the filaments are made or a material similar to it, and then heating the entire structure until the walls of the individual filaments bond together and to the walls of the sleeve, forming a leak-tight front surface with a plurality of openings 34 leading into each filament. The individual tubes are held together over their length between the headers by strap 33.

The tube and shell heat exchanger of FIG. 2 is only one embodiment of the present invention. FIG. 4 illustrates a second embodiment where the casing 11 is an open tank having an inlet 12 and an outlet 13 for the second heat exchanger fluid. The tube bundle 20, with the terminal portions thereof securely bonded into sleeves 21, as shown in FIG. 3, is then supported in the tank by brackets 19 so that the bundle droops in a u-shaped loop into the tank, with the bundle portion, but not the terminal portions thereof, below the level 14 of the second heat exchanger fluid in the tank. The interior of the tube bundle is connected to inlet 24 and outlet 26 by elbows 25 and connectors 23 which attach to sleeve portion 21.

Although certain preferred embodiments of the invention have been described in detail, many variations and modifications within the scope of the invention will be obvious to one skilled in the art and all such are intended to fall within the scope of the following claims.

What is claimed is:

1. A method of transferring heat between two fluid masses comprising: passing a first fluid mass through the interior and directly into contact with the inner surface of a plurality of hollow filaments made from a plastic composition containing 5 to 45 percent by weight of filler particles having a thermal conductivity substantially greater than the thermal conductivity of the plastic, substantially all of said filler particles having a diameter greater than 2.0 microns and the ratio of the diameter of said filler particles to the wall thickness of said filaments is 0.001 to 0.1, said filler particles having a distribution in said plastic composition which is homogeneous enough so that said filaments have a tensile strength greater than 1,000 psi and an elongation to failure of greater than 25 percent at room temperature and heterogeneous enough so that said filaments have a thermal conductivity greater than twice the thermal conductivity of the plastic; and directly contacting substantially the entire outer surface of said hollow filaments with a second fluid mass having an overall temperature difference from said first fluid mass.

2. The method of claim 1 wherein said plastic is a polyfluorinated plastic, said filler particles are graphite filler particles having a diameter of 2.0 to 50 microns, and the ratio of the diameter of said filler particles to the wall thickness of said filaments is 0.001 to 0.1.

3. The method of claim 2 wherein said plastic composition contains 5 to 25 percent by weight of said filler particles, and wherein said filaments have a thermal conductivity greater than one and a half times the thermal conductivity of the plastic.

4. The method of claim 2 wherein said plastic composition contains 10 to 20 percent by weight of said filler particles, said filaments have a thermal conductivity greater than one and a half times the thermal conductivity of the plastic, and wherein said polyfluorinated plastic is a polyfluorinated plastic selected from the group consisting of a polymer of tetrafluoroethylene and copolymers of tetrafluoroethylene and hexafluoropropylene.

* * * * *